United States Patent [19]
Bauer

[11] Patent Number: 5,456,488
[45] Date of Patent: Oct. 10, 1995

[54] PASSENGER AIRBAG CANISTER TO COVER ATTACHMENT

[75] Inventor: John G. Bauer, Troy, Mich.

[73] Assignee: Morton International, Inc., Chicago, Ill.

[21] Appl. No.: 335,656

[22] Filed: Nov. 8, 1994

[51] Int. Cl.$^6$ ............................................ B60R 21/16
[52] U.S. Cl. .................... 280/728.1; 280/728.2; 280/732
[58] Field of Search .................. 280/728 A, 728 R, 280/732, 743 R, 728 B

[56] References Cited

U.S. PATENT DOCUMENTS

| | | | |
|---|---|---|---|
| 4,925,209 | 5/1990 | Sakurai | 280/743 |
| 5,031,930 | 7/1991 | Sato | 280/732 |
| 5,066,037 | 11/1991 | Castrigno et al. | 280/732 |
| 5,125,683 | 6/1992 | Nakajima | 280/228 B |
| 5,199,239 | 4/1993 | Fujiwara et al. | 280/728 B X |
| 5,217,254 | 6/1993 | Satoh | 280/732 |
| 5,228,362 | 7/1993 | Chen et al. | 280/728 B X |
| 5,238,264 | 8/1993 | Barnes | 280/732 |
| 5,301,966 | 4/1994 | Sakata | 280/728 |
| 5,303,951 | 4/1994 | Goestenkors et al. | 280/728 B |
| 5,306,040 | 4/1994 | Leonelli et al. | 280/728 B |
| 5,316,334 | 5/1994 | Skidmore | 280/728 B |
| 5,316,822 | 5/1994 | Nishijima et al. | 428/138 |
| 5,378,012 | 1/1995 | Seiki et al. | 280/728 B |

FOREIGN PATENT DOCUMENTS 0447030  9/1991  European Pat. Off. ............ 280/728 A

*Primary Examiner*—Kenneth R. Rice
*Assistant Examiner*—Christopher P. Ellis
*Attorney, Agent, or Firm*—George W. Rauchfuss, Jr.; Gerald K. White

[57] ABSTRACT

A cover is mounted on an airbag canister in a manner which allows relative movement in three directions to permit a proper fit of the cover to the instrument panel of the vehicle in which the airbag is mounted. The airbag canister has a plurality of mounting holes in an upper sidewall with a plurality of threaded studs mounted therein and extending axially, generally transversely outwardly from the sidewall. An airbag cover is provided with a forwardly extending door portion which is adapted to fit in an opening of the instrument panel. The cover has a rearwardly extending portion with a plurality of openings therein adapted to receive the threaded studs for attaching the cover to the airbag canister. A shoulder nut is mounted on each of the studs for retaining the cover on the canister with sufficient structural integrity to maintain the attachment of the cover to the canister during airbag deployment. The openings in the rearwardly extending portion of the airbag cover are larger than the diameter of the threaded shoulder nuts. The shoulder nut has a head larger than the openings in the cover. The size of the openings in the rearwardly extending portion of the cover and the distance between the head of the shoulder nuts and the sidewall of the canister are such that three directions of relative movement between the canister and cover are provided to enable proper fit and finish of the airbag covers with the vehicle instrument panel.

10 Claims, 2 Drawing Sheets

PASSENGER AIRBAG CANISTER TO COVER ATTACHMENT

FIELD OF THE INVENTION

This invention relates to a passenger side inflatable airbag assembly, and more particularly, to an airbag cover to canister attachment which provides for relative movement in three directions between the cover and canister to permit a proper fit of the cover to the instrument panel of the vehicle in which the system is installed.

BACKGROUND OF THE INVENTION

A typical problem with passenger side airbag covers is a poor fit to finish in the vehicle's instrument panel in which the passenger side airbags are installed. Uneven airbag cover to instrument panel gaps and non-flush conditions often exist simply because the covers are fixedly mounted or permanently secured to the airbag canister with no adjusting movement therebetween being possible. Of course, it is essential with any type of airbag cover to canister attachment to provide and maintain attachment of the cover to the canister during the deployment of the airbag.

Another common problem with passenger airbag covers resides in damages such as marks, mars, scuffs, scrapes, paint peel, sinks and the like to the visible surface. If the cover is permanently attached to the airbag canister, the entire airbag module must be replaced. Likewise, if the canister is to be serviced, the entire module must be removed which could cause damage to the airbag cover or again provide an improper fit of the canister along with its permanently mounted cover.

Accordingly, it is an object of this invention to provide a new and improved passenger airbag cover to canister attachment which overcomes the problems enumerated above.

Another object of this invention is to provide a new and improved passenger airbag cover to canister attachment which allows movement of the cover relative to the airbag canister in three directions while still providing enough structural integrity to maintain attachment of the cover to the canister during airbag deployment.

Still another object of this invention is to provide a new and improved passenger side airbag cover to canister attachment in which the cover can be removed and replaced if necessary without replacing the entire airbag module.

Yet another object of this invention is to provide a new and improved passenger airbag cover to canister attachment which is provided with a tamper-proof feature.

BRIEF SUMMARY OF THE INVENTION

In carrying out this invention in one illustrative embodiment thereof a passenger airbag cover to canister attachment is provided for mounting a cover on an airbag canister which allows relative movement in three directions to permit a proper fit of the cover to the instrument panel of the vehicle on which the airbag is mounted. The airbag canister is provided with a plurality of mounting holes in an upper sidewall surface thereof, in which holes a plurality of threaded studs are mounted to axially extend generally transversely outwardly from said sidewall. An airbag cover has a forwardly extending door portion adapted to fit in an opening in the instrument panel of a vehicle in which the airbag is installed and a rearwardly extending portion having a plurality of openings in the rearwardly extending portion adapted to be received on the threaded studs. A threaded shoulder nut is mounted on each of the studs for retaining the cover on the canister with sufficient structural integrity to maintain attachment of the cover to the canister during airbag deployment. The plurality of openings in the rearwardly extending portion of the airbag are larger than the diameter of the threaded shoulder nuts. The shoulder nut has a head larger than the openings in the cover. As a result of the size of the openings in the rearwardly extending portion of the cover and the distance between the heads of the shoulder nuts and the sidewall of the canister, three directions of relative movement between the cover and the canister is provided.

BRIEF DESCRIPTION OF THE DRAWINGS

The invention, together with further aspects, features, objects and advantages thereof will be more clearly understood from the following description taken in connection with the accompanying drawings.

DESCRIPTION OF THE PREFERRED EMBODIMENTS

Figure 1:
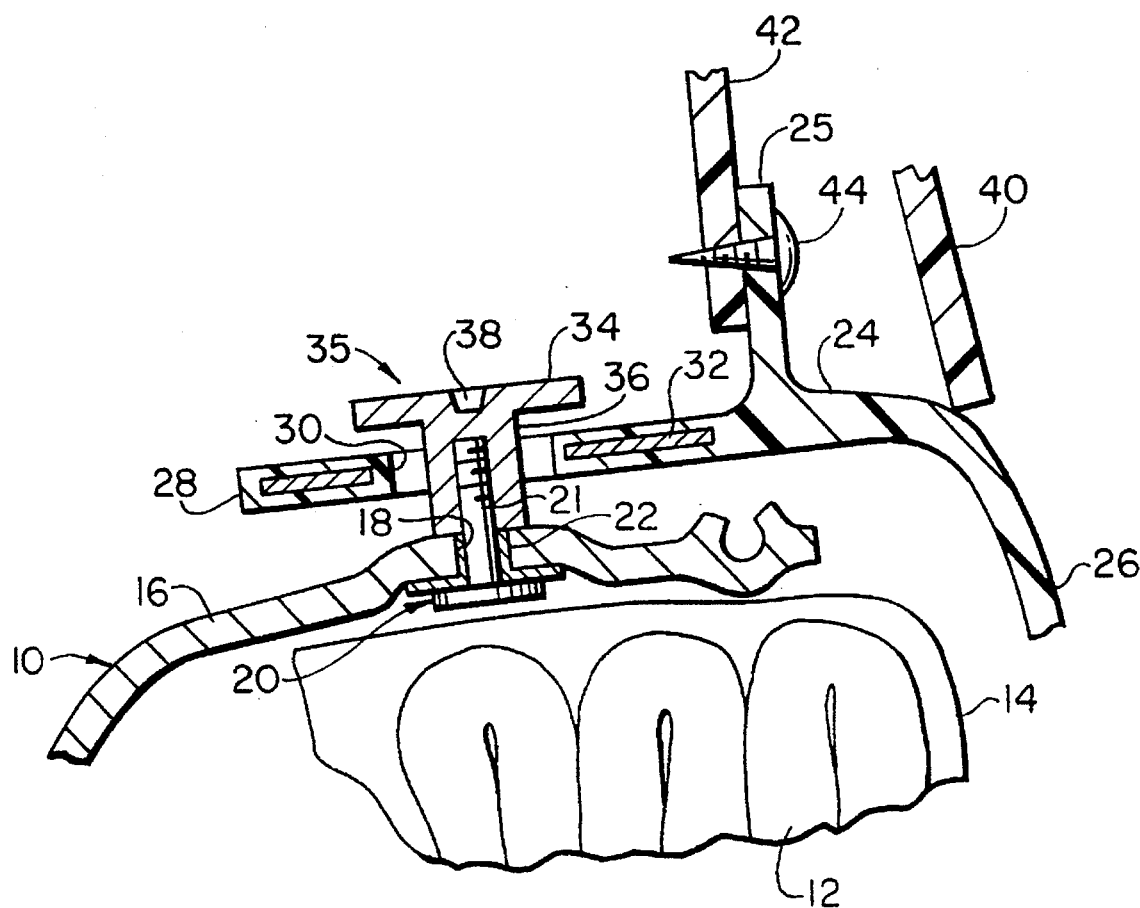
FIG. 1 is a partial side elevational cross sectional view of a portion of an airbag cover mounted on an airbag canister and positioned in an instrument panel of a vehicle.

Referring now to FIG. 1, an airbag canister is referred to generally by reference numeral 10. Such an airbag canister may be a trough-shaped reaction canister known in the art and having sidewalls, a bottom and an open top for receiving an inflatable airbag. As shown in FIG. 1 such a canister 10 has an upper portion of its sidewall surface 16 provided with a plurality of mounting holes 18 therein. The canister 10 houses a folded airbag cushion 12 having a protective cover 14.

An airbag cover 24 houses the canister 10 and positions the assembly in an instrument panel 40. The airbag cover 24 has a mounting flange 25 thereon and a forward extending portion 26 which forms the door of the airbag assembly. The door is provided with a tear seam (not shown) which fractures on the deployment of the airbag cushion 12. The cover 24 also includes a rearwardly extending portion 28 for mounting the cover 24 on the canister 10. The rearwardly extending portion 28 has a plurality of openings 30 therein which is adapted to receive the mounting structure for the assembly. In connection with this description, the term forwardly refers to a direction facing a vehicle occupant and the term rearwardly refers to a direction away from a vehicle occupant to be protected by deployment of the airbag.

The mounting structure includes a plurality of threaded studs 20 and shoulder nuts 35. The threaded studs 20 are mounted in the mounting holes 18 in the upper portion of sidewall surface 16 of the airbag canister 10, The threaded studs 20 are mounted therein, for example, by a stud strap 22 with the threaded studs axially extending generally transversely outwardly from the sidewall 16. The threaded studs 20 may be fixedly mounted in the openings 18 in any suitable fashion with the illustrated stud strap 22 being provided for ease of assembly. As will be noted in FIG. 2, a plurality of mounting means are provided along the width dimension of the canister assembly with at least two being required and positioned in the upper portion of sidewall surface 16 of the canister 10 and the rearwardly extending portion 28 of the cover 24. A threaded shoulder nut 35 is mounted on each of threaded studs 20 for retaining the cover 24 on the canister 10 with sufficient structural integrity to maintain attachment of the cover to the canister during airbag deployment.

Figure 2:
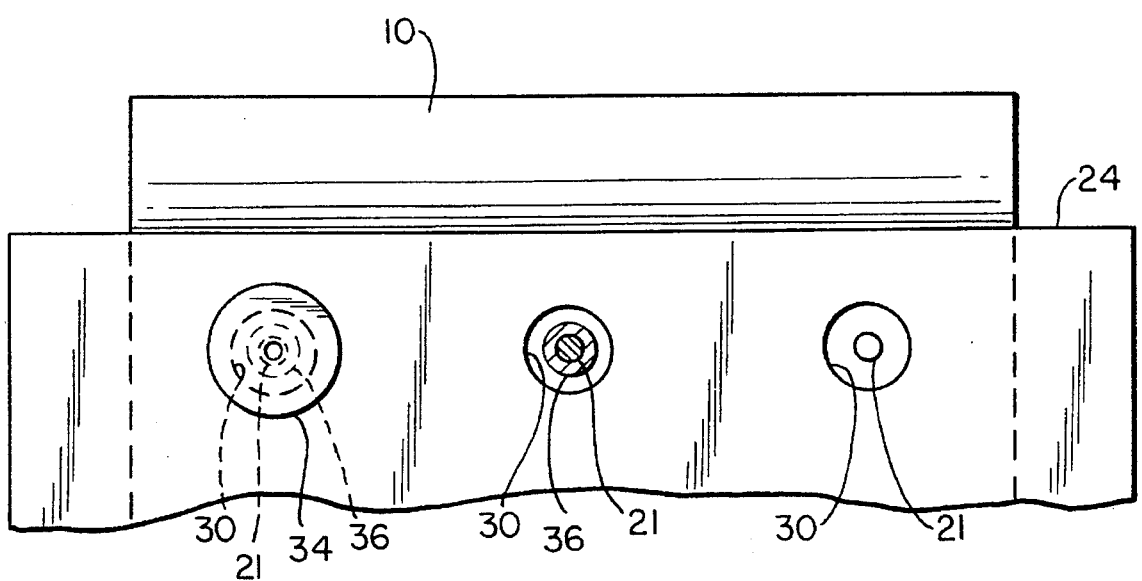
FIG. 2 is a partial top plan view of a cover attachment of this invention illustrating the attachment of the cover to an airbag canister in which one attachment means shows the shoulder nut in place while another has the shoulder nut removed and a third illustrates a cross-section of the shoulder nut in place but with the shoulder nut head removed.

As will be seen both in FIGS. 1 and 2, the openings 30 are larger in size or diameter than the diameter of the threaded body portion 36 of the shoulder nut 35, while the size of the head 34 of the shoulder nut 35 is larger than that of the opening 30. It will be appreciated that while FIGS. 1 and 2 show openings 30 as being generally circular in shape, such openings may be of any suitable shape, such as, for example, square, rectangular, oval or circular, so long as the opening is larger in size than the diameter of the body 36 of the shoulder nut 35 so that directional adjustment of the cover 24 with respect to canister 10 is possible in two directions. A third directional adjustment of cover 24 with respect to canister 10 is possible due to the distance between head 34 of shoulder nut 35 and canister sidewall 16 when the shoulder nut is threaded onto threaded stud 20. The distance from sidewall 16 to head 34 will be greater than the thickness of rearwardly extending portion 28 of cover 24. The three direction relative movement still provides enough structural integrity to maintain attachment of the cover 24 to the canister 10 during a deployment of the airbag cushion 12.

The head 34 of the shoulder nut 35 may be provided with a tamper-proof driver receptacle 38 generally located centrally therein. This receptacle 38 requires a special tool for the tightening or the removal of the shoulder nut 35 thereby providing a tamper-proof element to the mounting structure. The rearwardly extending portion 28 of the cover 24 may optionally contain a metal or other reinforcing insert 32 around openings 30 for providing additional structural integrity for the assembly.

In assembly, the cover 24 is positioned in the instrument panel 40 to provide an excellent fit with essentially no gaps or non-flush conditions. A screw 44 mounts the cover on the instrument panel substructure 42 as shown in FIG. 1. The canister 10 is then positioned on the cover 24 by placing threaded studs 20 of the canister into openings 30 of the cover. Shoulder nuts 35 are then screwed down on the threaded studs 20 to lock the cover 24 to the canister 10. This flexible assembly arrangement permits three directional relative movement between the airbag canister 10 and the cover 24 which permits good fit and finish and serviceability to be obtained. Other mounting sequences are envisioned.

A common problem of passenger airbag covers resides in damages such as marks, mars, scuffs, scrapes, paint peel, etc. on the visible surface 26 of cover 24. If the cover has been permanently attached to the airbag canister, the entire airbag module must be replaced. In accordance with the present invention, the cover 24 can be removed and readily replaced if necessary. The same is true for the airbag canister 10. Replacing only the cover or only the canister rather than the entire airbag module provides a substantial cost savings benefit.

Accordingly, an improved airbag cover to canister attachment is provided with a three direction adjustment between the mounting of the airbag canister and the airbag cover to provide an excellent fit and finish in the vehicle's instrument panel. The attachment also provides structural integrity to maintain the attachment of the cover to the canister during deployment of the airbag. In addition, the airbag cover or canister can each be independently removed and replaced without removing and replacing the entire unit. Also, tamper-proof means can be provided to prevent or reduce unauthorized tampering with the mounting structure.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

I claim:

1. A passenger airbag cover to canister attachment for mounting a cover on an airbag canister which allows relative movement in three directions of the cover with respect to the canister to permit a proper fit of the cover to an instrument panel of a vehicle comprising:

an airbag canister having a plurality of mounting holes in a sidewall surface thereof, a plurality of threaded studs mounted in said plurality of mounting holes with the threaded studs extending outwardly from the sidewall, an airbag cover having a forwardly extending door portion adapted to fit in an opening in an instrument panel of a vehicle in which a passenger airbag is installed and a rearwardly extending portion adapted to be attached to said airbag canister, a plurality of openings in said rearwardly extending portion of said airbag cover receiving said threaded studs, a shoulder nut, having a head and threaded body, mounted on each of said threaded studs for retaining attachment of said cover on said canister sidewall, wherein the heads of said shoulder nuts, when threaded on said threaded studs, are located at a distance from the canister sidewall and the size of the opening of each of the plurality of openings is greater than a diameter of the threaded body of the shoulder nut such that the attachment can provide relative movement of the canister to the cover in at least three directions.

2. The structure as claimed in claim 1 wherein each of said shoulder nuts is provided with a tamper-proof driver receptacle.

3. The structure as claimed in claim 1 wherein each of said studs is mounted on said canister by a stud strap.

4. The structure as claimed in claim 1 wherein said rearwardly extending portion of said airbag cover contains a reinforcing insert around the openings.

5. The structure as claimed in claim 2 wherein said rearwardly extending portion of said airbag cover contains a reinforcing insert around the openings.

6. The structure as claimed in claim 4 wherein the reinforcing insert is metal.

7. The structure as claimed in claim 5 wherein the reinforcing insert is metal.

8. The structure as claimed in claim 1 wherein the threaded studs extend generally transversely outwardly from the sidewall.

9. The structure as claimed in claim 2 wherein the threaded studs extend generally transversely outwardly from the sidewall.

10. The structure as claimed in claim 4 wherein the threaded studs extend generally transversely outwardly from the sidewall.

\* \* \* \* \*